April 10, 1934.　　　　F. V. WALTZ　　　1,954,230
DOUBLE READING COUNTERPOISE FOR WEIGHING SCALES
Filed July 11, 1932　　2 Sheets-Sheet 1
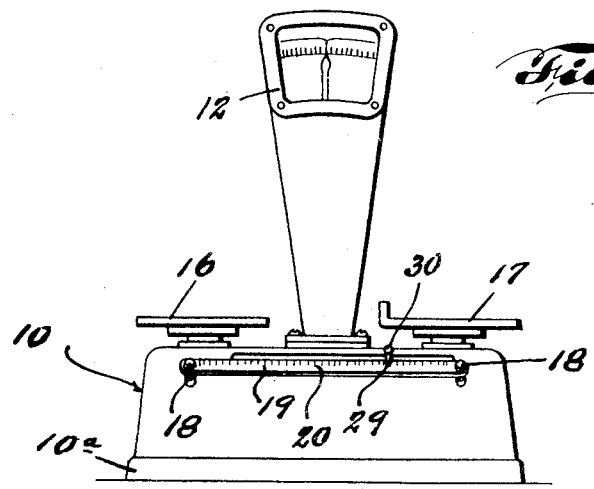
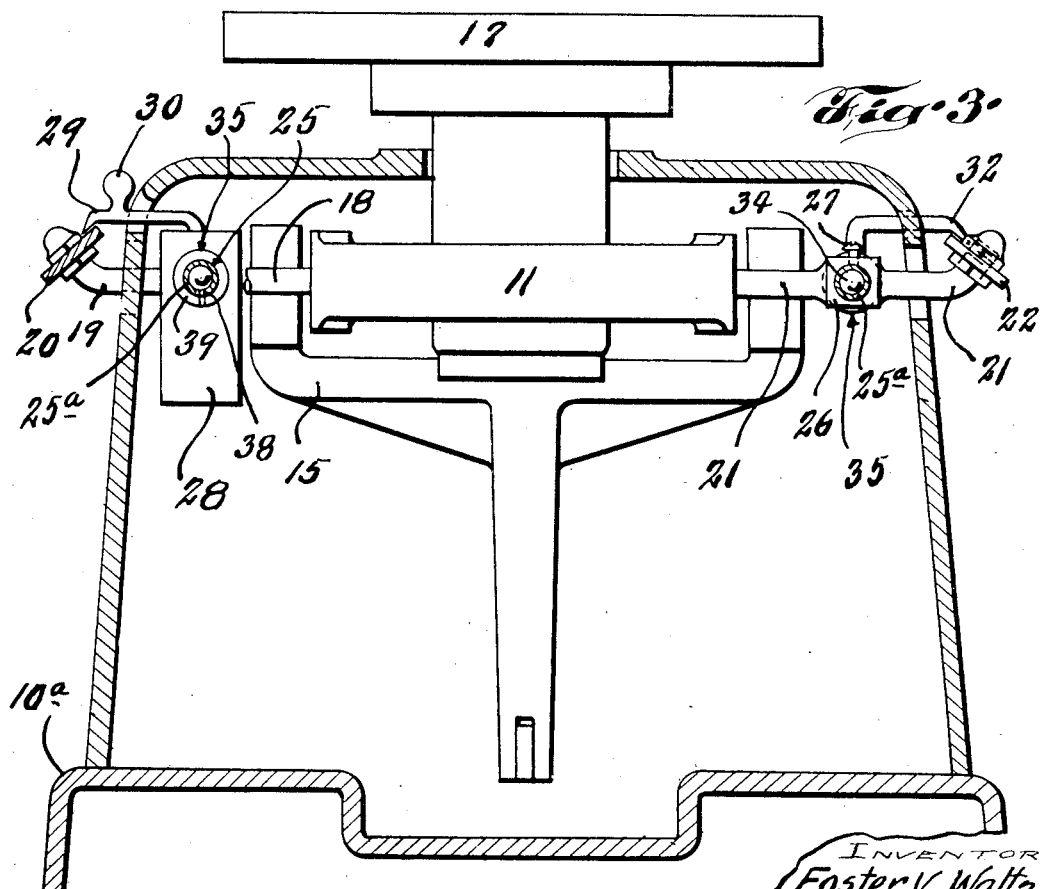
INVENTOR
Foster V. Waltz
By William Janne
ATTORNEY

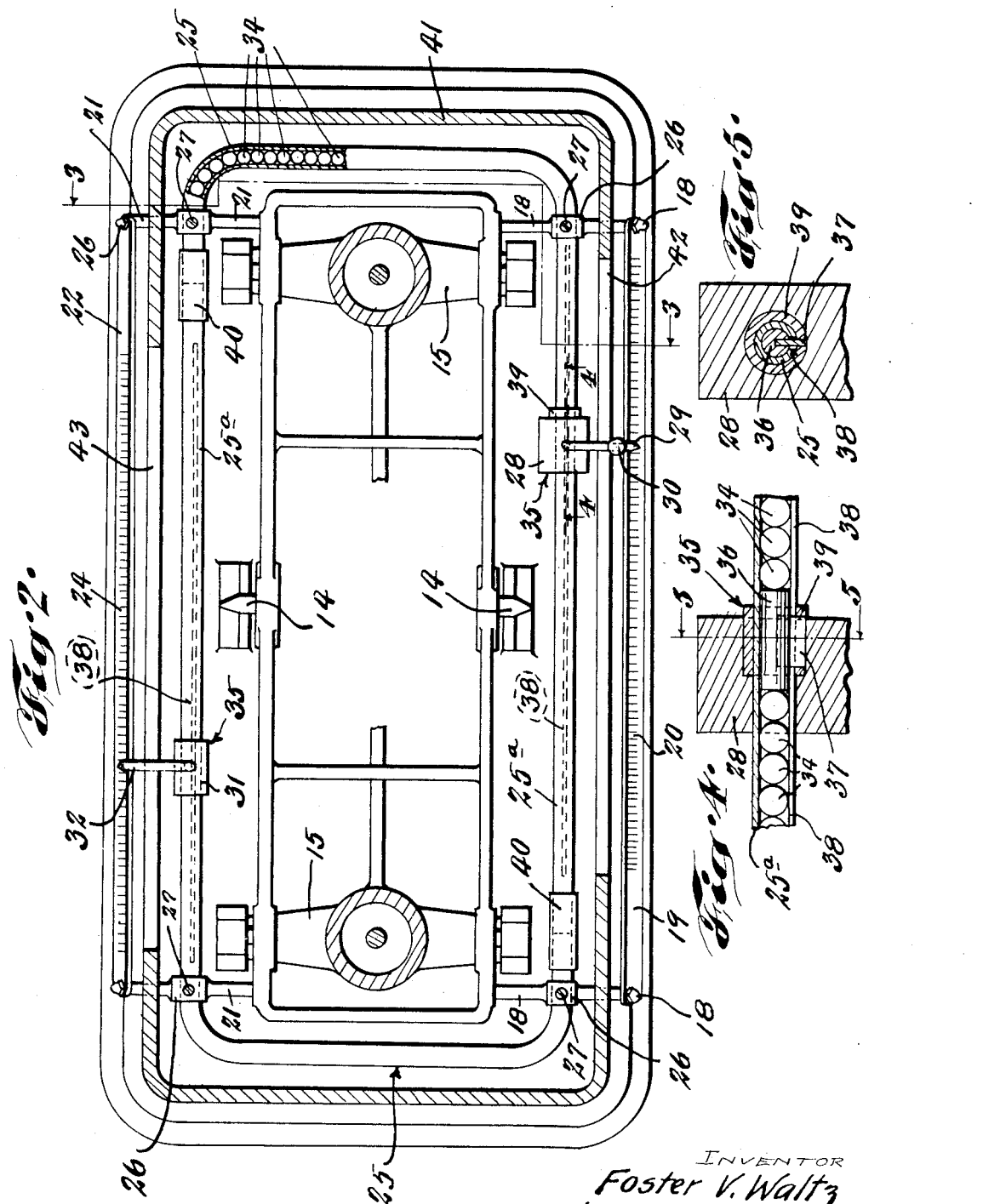

Patented Apr. 10, 1934

1,954,230

UNITED STATES PATENT OFFICE 1,954,230

DOUBLE READING COUNTERPOISE FOR WEIGHING SCALES

Foster V. Waltz, St. Louis, Mo.

Application July 11, 1932, Serial No. 621,908

10 Claims. (Cl. 265—54)

This invention relates to new and useful improvements in weighing scales.

Counter scales are usually provided with a tare beam on one side (dealer's side) only and no provision is made to enable the customer to ascertain the location of the poise on said tare beam. It is desirable, and in some States required, that a counter scale equipped with a tare beam shall have its poise so arranged that it can be read on the customer's side as well as the dealer's side so that the customer can readily see the exact location of the poise on the tare beam.

The primary object of the invention is to provide a counter scale having a tare beam and a counter poise therefor arranged on the dealer's side and having a poise reading means arranged on the customer's side and operable by said poise to indicate accurately the exact location of the latter on said tare beam.

Other objects of the invention are to provide a pair of graduated tare beams arranged on the opposite sides of a counter scale and carried by the scale beam thereof, one of said tare beams being associated with a counter poise and the other with a pointer, said counter poise and said pointer being operatively interengaged by means of a plurality of balls arranged in a single row and entirely filling a suitable endless race-way carried by said scale beam whereby the movement of the counter poise is transmitted by said balls to said pointer and causes corresponding movement thereof so that the location of the counter poise on its tare beam can be ascertained by means of said pointer and the other tare beam.

Further objects of the invention are to provide a scale beam provided with a pair of graduated tare beams and with a tubular endless member encircling said scale beam and having its side portions arranged parallel with said tare beams, said tubular member being completely filled with a plurality of steel balls arranged in a single row and in contiguous relation, one of said side portions having slidably mounted thereon a counter poise cooperating with one of said tare beams, said counter poise having a projection extending into said tubular member and interposed between two adjoining balls, the other side portion having slidably mounted thereon a pointer cooperating with the other tare beam, said pointer having a similar projection extending into said tubular member for engagement with said balls, whereby the movement of the counter poise is transmitted by said balls to said pointer and the latter indicates the exact location of the counter poise on the tare beam.

With these and other objects in view, my invention consists in certain novel features of construction and arrangement of parts, hereinafter more fully described and claimed, and illustrated in the accompanying drawings, in which—

Figure 1 is a front elevational view of a counter scale equipped with my double reading tare beam.

Figure 2 is a horizontal cross section taken through the scale above the scale beam thereof.

Figure 3 is a vertical cross section taken on line 3—3 of Figure 2.

Figure 4 is an enlarged detail cross section taken on line 4—4 of Figure 2.

Figure 5 is a vertical cross section taken on line 5—5 of Figure 4.

Referring by numerals to the accompanying drawings, 10 indicates a counter scale having a base 10a, a scale beam 11, and a weight indicating means 12. In the present instance, the scale beam is fulcrumed at 14 and has pivotally mounted near its ends hangers 15 carrying, respectively, a weight receiving platform 16 and a load receiving platform 17.

Extending outwardly from the dealer's side of the scale beam 11 and near each end thereof is a horizontally disposed pin 18 to which is attached a tare beam 19 having graduations 20. Similar pins 21 extend outwardly from the other or customer's side of the scale beam and secured to said pins is a tare beam 22 having graduations 24. The tare beams 19 and 22 are disposed parallel with the scale beam and the respective graduations 20 and 24 of said beams are identical.

An endless tubular member 25, which, in the present instance, is of rectangular shape, is disposed horizontally and surrounds said scale beam. The side portions 25a of said tubular member are arranged parallel with the respective tare beams and are disposed intermediate said scale beam and said tare beams. Said member 25 is supported in position by sleeves 26 which are formed horizontally and transversely in the respective pins 18 and 21. A set screw 27 is screwseated in each sleeve and serves to secure the tubular member in position therein. A poise 28 is slidably mounted for movement longitudinally of tare beam 19 and, in the present instance, is slidably mounted on one of the side portions 25a and is provided with a pointer 29 which extends outwardly and terminates adjacent to and over the graduations 20 of said tare beam 19. This pointer or extension is provided with a handle 30 by means of which said poise can be manually operated. An indicator 31 is slidably arranged on the other side portion 25a for movement longitudinally of tare beam 22 and is provided with a pointer 32 which extends outwardly and terminates adjacent to graduations 26 of said tare beam.

Tubular member 25 is completely filled with a plurality of balls 34, preferably steel balls such as are used for ball bearings, and poise 28 and indicator 31 have operative engagement with said balls whereby the manual operation of poise 28 is transmitted by said balls to indicator 31 so that the latter is automatically operated in accordance with the actuation of the poise.

This operative engagement between the poise 28 and indicator 31 and the balls 34 is effected by suitable operative connections 35 which, in the present instance, consist of a short cylindrical section or plunger 36 slidably arranged in each side portion 25a and having its ends bearing against the adjacent balls 34 and a blade 37 fixed to said plunger 36 and extending radially from said tubular member 25 through a slot 38 formed in the latter. This blade is fixed to a sleeve 39 which is slidably mounted on said tubular member. In the case of indicator 31 this sleeve 39 forms the body portion of said indicator and in the case of poise 28 said sleeve 39 is secured to said poise, as shown in Figure 4. Slot 38 is formed on the underside of each side portion 25a and is of sufficient length to permit the required movement of poise 28 relatively to tare beam 19.

Tubular member 25 is preferably formed in two sections which are identical in size and shape and the ends of which are secured together by suitable couplings 40. As the balls 34 completely fill the tubular member 25 and extend equally in both directions of the fulcrum 14 of the scale beam the movement of said balls during the actuation of the poise does not disturb the balance of the scale. Also the use of balls reduces friction to minimum and the poise 28 can be easily operated. Where a casing 41 is used to enclose the scale beam, as in the present case, member 25 is arranged within the casing while the pins carrying the tare beams extend outwardly through slots formed in said casing. The latter is provided with a longitudinally disposed slot 42 through which pointer 21 extends outwardly and a slot 43 through which pointer 32 extends outwardly.

I claim:

1. In a counter scale, the combination with a scale beam, of a pair of tare beams carried thereby on opposite sides thereof, an endless tubular member carried by and surrounding said scale beam and having its side portions substantially parallel with said tare beams, a plurality of balls arranged in a single row and completely filling said tubular member, a poise mounted on one of said side portions and movable longitudinally of the respective tare beam and in operative engagement with said balls, and an indicator mounted on the other side portion movable longitudinally of its respective tare beam, said poise and said indicator being in operative engagement with the balls contained in the respective side portions, whereby the actuation of said poise is transmitted by said balls to said indicator and the latter is moved accordingly.

2. In a counter scale, the combination with a scale beam, of a pair of graduated tare beams carried thereby and arranged on the opposite sides thereof, a rectangular endless tubular member carried by and encircling said scale beam and having its side portions substantially parallel with said tare beams, a plurality of balls arranged within said tubular member in a single row and in juxtaposed relation, and operative connections between said counter poise and the balls contained within the other side portion and between said indicator and the balls contained within the other side portion whereby the motion produced by the actuation of said poise is transmitted by said balls to said indicator and the latter is moved in accordance with the movement of said poise.

3. In a counter scale, the combination with a scale beam, of a pair of graduated tare beams arranged on opposite sides thereof and carried thereby, a pointer movable longitudinally of each tare beam, an endless tubular member fixed to said scale beam and arranged in spaced relation therewith and with said tare beams, a plurality of balls arranged in an endless row in said tubular member, and a plunger slidably arranged in said tubular member adjacent to each tare beam and in fixed relation with the respective pointer, each plunger being arranged in juxtaposed relation with the adjacent balls whereby the movement of one of said pointers longitudinally of the respective tare beam is transmitted by said balls to the other pointer and causes a corresponding movement thereof.

4. In a counter scale, the combination with a scale beam, of a pair of graduated tare beams arranged on the opposite sides of and carried by said scale beam, and a rectangular endless tubular member encircling said scale beam and having its side portions arranged in substantially parallel relation with said tare beams, a plurality of balls completely filling said tubular member in an endless row, a pointer slidably mounted on each side portion and movable longitudinally of the respective tare beam, and means operatively associated with each pointer and the corresponding balls for transmitting movement of one of said pointers to the other pointer through the medium of said balls.

5. A double reading tare beam for weighing scales comprising in combination with a scale beam, of a pair of tare beams carried by said scale beam on the opposite sides thereof, a poise movable longitudinally of one of said tare beams, an indicator movable longitudinally of the other tare beam, and ball bearing transmission carried by said scale beam and operatively connected to said poise and to said indicator whereby the actuation of said poise relatively to said tare beam produces corresponding movement of its indicator relatively to the other tare beam, said means comprising an endless tubular member encircling said scale beam and having its sides arranged substantially in parallelism with said tare beams, a plurality of balls completely filling said tubular member, and means operatively associated with said poise and with said balls and other means operatively associated with said indicator and the corresponding balls whereby the movement of said poise is transmitted through said balls to said indicator.

6. A double reading tare beam construction for weighing scales comprising in combination with a scale beam, of a pair of tare beams carried by said scale beam adjacent to opposite sides thereof, a poise movable longitudinally of one of said tare beams, an indicator movable longitudinally of the other tare beams, an endless tubular member surrounding said scale beam and arranged in spaced parallel relation with said tare beams, a plurality of balls competely filling said tubular member, and connections between said balls and said poise and said pointer whereby the movement of said poise is transmitted by said balls to said indicator.

7. A double reading tare beam construction for weighing scales comprising in combination with a scale beam, of a pair of tare beams carried by said scale beam on its opposite sides, a poise movable longitudinally of one of said tare beams, an indicator movable longitudinally of the other tare beam, an endless tubular member surrounding said scale beam, a plurality of balls completely filling said tubular member, a pair of plungers slidably arranged in said tubular member adjacent respectively to said poise and to said indicator, and operative connections between said poise and said indicator and the respective plungers, whereby the movement of said poise along its respective tare beam actuates said indicator a corresponding distance along its respective tare beam.

8. In a double reading construction for counter scales, the combination with a scale beam, of a pair of tare beams fixed to the opposite sides of said scale beam, a pointer movable longitudinally of each tare beam, an endless tubular member carried by said scale beam in spaced relation with said tare beams, a plurality of balls arranged contiguous relative to said tubular member, a plunger slidably arranged in said tubular member adjacent to each pointer and in contact with the adjacent balls, and an operative connection between each plunger and the corresponding pointer, whereby the movement of one pointer is transmitted by said balls and parts associated therewith to the other pointer.

9. In a counter scale, the combination of a scale beam, an endless tubular member of substantially rectangular shape fixed to and surrounding said scale beam, the side portions of said tubular member being provided with longitudinal slots, a graduated tare beam fixed to each side of said scale beam and arranged in spaced relation with the corresponding side members of said tubular member, a poise slidably mounted on one side member of said tubular member and movable longitudinally of the corresponding tare beam, a pointer slidably mounted on the other side member of said tubular member and movable longitudinally of its tare beam, means associated with said poise and with said pointer and extending into the corresponding side portion of said tubular member through said slots and a plurality of balls arranged in a single row in said tubular member and completely filling the same and associated with said means whereby the actuation of said poise moves said pointer accordingly.

10. In a counter scale, the combination of a scale beam, a pair of pins fixed to each side of said scale beam and extending transversely thereof, an endless tubular member surrounding said scale beam and having its side members fixed to said pins, a graduated tare beam arranged in parallel spaced relation with each side member of said tubular member and fixed to the ends of the corresponding pair of pins, a poise movable longitudinally of one of said tare beams, a pointer movable longitudinally of the other tare beam, a plurality of balls arranged within said tubular member and completely filling the same, and means associated with said poise and with said pointer and extending into the respective side members of said tubular member through longitudinal slots formed therein and operatively associated with said balls whereby the manual operation of said poise relatively to its tare beam operates said pointer accordingly.

FOSTER V. WALTZ.